R. P. JACKSON.
RECTIFIER.
APPLICATION FILED FEB. 19, 1914.
1,298,726. Patented Apr. 1, 1919.
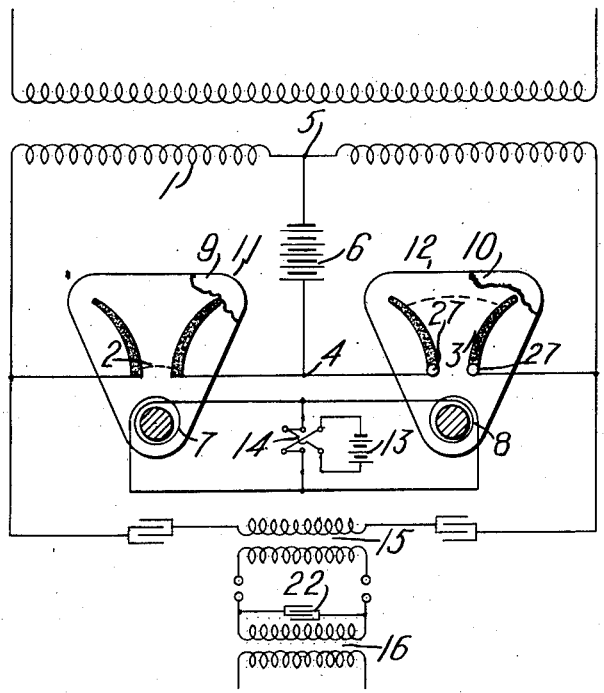
Fig. 1.
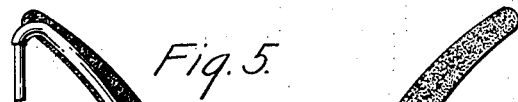
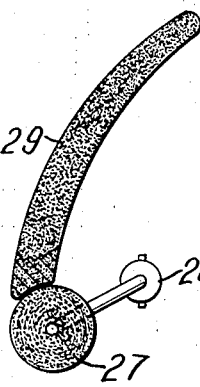
Fig. 5. Fig. 6.
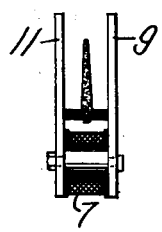
Fig. 4.
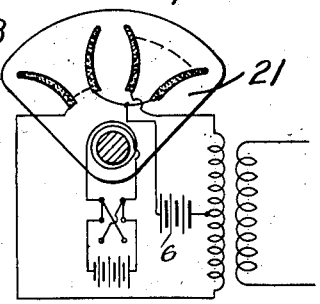
Fig. 3.
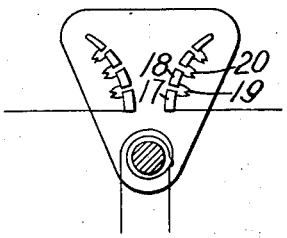
Fig. 2.
WITNESSES:
Fred A. Lind.
David C. Davis
INVENTOR
Ray P. Jackson
BY
Wesley D. Carr
ATTORNEY

UNITED STATES PATENT OFFICE.

RAY P. JACKSON, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

RECTIFIER.

1,298,726.   Specification of Letters Patent.   Patented Apr. 1, 1919.

Application filed February 19, 1914. Serial No. 819,822.

*To all whom it may concern:*

Be it known that I, RAY P. JACKSON, a citizen of the United States, and a resident of Edgewood Park, in the county of Allegheny and State of Pennsylvania, have invented a new and useful Improvement in Rectifiers, of which the following is a specification.

My invention relates to rectifying apparatus of the magnetic blowout type.

The object of my invention is to provide a device for rectifying alternating currents which shall be simple in design, positive in action, and which is not subject to inherent defects found in electrolytic and mercury vapor rectifiers.

Figure 1 of the accompanying drawing is a diagrammatic view of one embodiment of my invention; Figs. 2, 3, 5 and 6 are detail views of modifications of the arcing device; and Fig. 4 is a side view of the arcing device shown in Fig. 1.

My device comprises a source of alternating currents 1 which may be the secondary of a transformer or any other convenient source. Connected in series across the terminals of the source 1 of alternating currents are two horn gaps 2 and 3. Connected from a point 4 between the horn gaps to a mid point 5 of the alternating current source, is any desired direct current load such, for example, as a battery 6. Each of the horn gaps 2 and 3 is placed in a uni-directional magnetic field provided by coils 7 and 8 respectively. The coils 7 and 8 are provided with magnetizable cores having pole pieces 9 and 10 which co-act with corresponding pole pieces 11 and 12, to form intense magnetic fields through the horn gaps. The magnetizing windings 7 and 8 are reversely wound with respect to each other and are energized by any convenient source of direct current, such for example, as a battery 13. Connection is made with the battery 13 by means of a reversing switch 14 in order that the direction of current flow, and consequently the direction of flux in the uni-directional magnetic fields, may be readily reversed to reverse the direction of current flow in the rectified current circuit.

In order that the horn gaps 2 and 3 may be readily traversed by current from the source 1, they may be provided with any convenient ionizing means, such for example, as the transforming system shown at 15 and 16.

The transformer 16, supplied with alternating current from any suitable source induces high potential across the terminals of condenser 22 and the latter in discharging sets up high frequency oscillations through the primary of transformer 15. The secondary of transformer 15 has high potential, high frequency current induced therein which readily breaks down gaps 2 and 3. The frequency of this ionizing current is preferably much higher than the frequency of source 1.

While unnecessary for the operation of the device, I have found it very effectual to form the horns of the gaps 2 and 3 of some material of a refractory nature and a high specific resistance, such for example, as a mixture of carborundum and clay. Furthermore, if it is found, in the operation of my device, that the heating of the horns is excessive, they may be hollow and provided with fluid cooling means or the active portions thereof may be caused to rotate. These modifications are illustrated in Figs. 5 and 6. In Fig. 5 the refractory horn 24 is provided with a deep groove in the back thereof and in this groove is seated a pipe 25 carrying water or other suitable cooling fluid. The pipe 25 is preferably covered with an insulative enamel or otherwise insulated from horn 24 in order not to form a current shunt thereto. This insulating material is shown at 26.

In Fig. 6 the horn 29 is cut away at its base and a disk 27 of refractory material so placed as to bear the brunt of the arc. This disk is rotated by any suitable means such, for example, as the motor 28.

Referring to the form of device shown in Fig. 2 it may sometimes be more convenient to form the horns themselves of a plurality of members 17, 18, etc., of good conducting material adjacent members being connected by resistance members 19, 20, etc., of any desired or convenient form.

Referring to the form of device shown in Fig. 3, it is frequently desirable that the two horn gaps be placed in one magnetic field rather than to provide a separate field for each of them. This is accomplished by making the pole piece 21 somewhat wider than are the pole pieces 9 and 10, thus providing ample space for both horn gaps. The connections to one horn gap are reversed, as shown, so that, as current from the source tends to traverse both gaps, it flows in one direction, with respect to the common magnetic field, in one gap, and in the other direction in the other gap. Thus, the arc in one gap is maintained and in the other gap extinguished with each half-cycle, as in the system of Fig. 1.

Having thus described my device in the form which I believe best suited to operating conditions, I will proceed to a description of the operation. If a positive wave flows from the left hand end of source 1, it will readily pass between the closely adjacent portions of the horns 2 and of the horns 3 owing to the fact that these gaps are kept continuously ionized by the Tesla transformer 15—16. It will be observed, however, that, because of the fact that coils 7 and 8 are reversely wound with respect to each other, the action of the flux of coil 7 upon the arc between horns 2 will be to force it down toward the coil, and keep it of a minimum length and of consequent low resistance. On the other hand, the action of the flux of coil 8 will be such as to force the arc between horns 3 out toward the tips. The result will be that, not only is the resistance of the arc greatly increased, owing to its attenuation but also the resistance of this path is greatly increased, owing to the fact that the high resistance horns 3 themselves are inserted therein.

The result of this simultaneous action in the two gaps will be that the point 4 will cease to be a point of intermediate potential but will rise with respect to point 5 and the heavy current coming through gap 2 will be forced up through the battery 6 to the mid point 5 of the transformer.

In the next half cycle the state of affairs is reversed. A positive wave, leaving the right hand end of source 1, will encounter little resistance in the gap 3 and high resistance in the gap 2 and the major portion will therefore, be forced up through the battery 6. It is thus seen that the current through the battery 6 is unidirectional.

While I have described the arc as blown out to the extremities of the horns, the device may be so designed as to completely extinguish the arc in one of the gaps during each half cycle, thus introducing at that point practically infinite resistance.

It may frequently happen that one desires direct current to flow from point 5 to point 4 instead of in the reverse direction. This result may be readily attained by reversing the direction of flux from the coils 7 and 8 by means of the reversing switch 14. Under these conditions, a negative wave from the left hand end of source 1 will encounter a low resistance at gap 2 and a high resistance at gap 3, and vice versa.

If it is desired to smooth out the pulsations in the uni-directional current supply to battery 6, such result may be secured by the insertion of inductance between points 4 and 5, as is common in the art, but this inductance is not necessary for maintaining current flow, as is frequently the case in mercury vapor rectifiers.

Obviously, the coils 7 and 8 may be energized from the battery 6, if found desirable, instead of using a separate source.

I claim as my invention:

1. A rectifying system comprising a source of alternating current, two horn gaps of variable length, a connection from one terminal member of each gap to a terminal of said source, respectively, a connection from each of the remaining gap terminals to substantially the mid point of said source through a load circuit, means permitting only waves of one polarity to traverse one horn gap and waves of the other polarity to traverse the other gap, and means for continuously ionizing each gap.

2. A rectifying system comprising a source of alternating current, two horn gaps, the horns of which are formed of high-resistance material, a connection from a terminal of each gap to a terminal of said source, respectively, a connection from each remaining gap terminal to substantially the mid point of said source, means for causing waves of one polarity to be urged to the tips of the horns of one gap and to the bases of the horns of the other gap and for waves of the other polarity to be urged to the bases of the horns of said first gap and to the tips of the horns of said last named gap.

3. A rectifying system comprising a source of alternating current, two horn gaps connected in series between the terminals of said source, means for producing unidirectional magnetic flux, transverse to each gap, means for continuously ionizing said gaps and a direct-current load circuit connected from a point between the two horn gaps to the mid point of the source of alternating current.

4. A rectifying system comprising a source of alternating current, two horn gaps connected in series between the terminals of said source, the horns of said gaps being of high-resistance material, means for producing unidirectional magnetic flux, transverse to each of said horn gaps, means for ionizing said gaps, and a direct-current load circuit connected from a point between the two horn gaps to the mid point of the source of alternating current.

5. A rectifying system comprising a source of alternating current, two horn gaps connected in series between the terminals of said source, means for producing unidirectional magnetic flux, transverse to each of said horn gaps, a source of high-frequency current for continuously ionizing the gaps, and a direct-current load circuit connected from a point between the two horn gaps to the mid point of the source of alternating current.

6. A rectifying system comprising a source of alternating current, two horn gaps connected in series between the terminals of said source, the horns of said gaps being of high-resistance material, means for producing unidirectional magnetic flux, transverse to each of said horn gaps, a source of high-frequency current for continuously ionizing said gaps, and a direct-current load circuit connected from a point between the two horn gaps to the mid point of the source of alternating current.

7. A rectifying system comprising a source of alternating current, means for producing unidirectional magnetic fields, two horn gaps placed in said magnetic fields and connected in series across the terminals of said source, a direct-current circuit connected from a point between said units to the mid point of said source, and means for reversing the direction of the direct-current flow by reversing the unidirectional magnetic fields.

8. A rectifying device comprising a horn gap, means for producing a unidirectional magnetic field thereacross in a direction substantially normal to the plane of the horns, and means for impressing an alternating electromotive force between said horns.

9. A rectifying device comprising a horn gap, one of the horns of which is formed of high-resistance material, means for producing a unidirectional magnetic field thereacross in a direction substantially normal to the plane of the horns, and means for impressing an alternating electromotive force between said horns.

10. The combination with means for producing a unidirectional magnetic field, of two members forming a discharge gap in said field, means for impressing an alternating electromotive force across said gap, and means for continuously ionizing said gap.

11. The combination with means for producing a unidirectional magnetic field, of two members forming a horn gap in said field, means for impressing an alternating electromotive force across said gap, and means for continuously ionizing said gap.

12. The combination with means for producing a unidirectional magnetic field, of two horn-shaped members of high resistance forming a horn gap in said field, means for impressing an alternating electromotive force across said gap, and means for continuously ionizing said gap.

In testimony whereof I have hereunto subscribed my name this 16th day of Feb., 1914.

RAY P. JACKSON.

Witnesses:
 GOLDIE E. McGEE,
 B. B. HINES.